(12) United States Patent
Singer (10) Patent No.: US 7,267,857 B1
(45) Date of Patent: Sep. 11, 2007

(54) MOUNTING AND LAMINATING SYSTEM

(75) Inventor: Karl Singer, Barrington Hills, IL (US)

(73) Assignee: D & K International, Inc., Elk Grove Village, IL (US)

( * ) Notice: Subject to any disclaimer, the term of this patent is extended or adjusted under 35 U.S.C. 154(b) by 139 days.

(21) Appl. No.: 10/394,436

(22) Filed: Mar. 21, 2003

(51) Int. Cl.
| | |
|---|---|
| B32B 27/00 | (2006.01) |
| A47G 1/12 | (2006.01) |
| B65D 69/00 | (2006.01) |
| B65D 73/00 | (2006.01) |
| B65D 25/54 | (2006.01) |
| G09F 1/12 | (2006.01) |
| B42D 15/10 | (2006.01) |

(52) U.S. Cl. ............ 428/35.2; 428/13; 428/542.2; 428/542.6; 428/913.3; 428/914; 206/232; 206/461; 206/466; 206/769; 206/770; 206/771; 40/124.06; 40/760; 283/81; 281/2; 281/5

(58) Field of Classification Search ............ 428/34.2, 428/35.2, 35.5, 35.7, 36.92, 13, 542.2, 542.6, 428/913.3, 914; 206/769, 770, 771, 215, 206/232, 449, 461, 466; 40/124.06, 594, 40/606.01, 702, 745, 760; 235/488; 283/81; 281/2, 5

See application file for complete search history.

(56) References Cited

U.S. PATENT DOCUMENTS

| | | | |
|---|---|---|---|
| 3,840,420 A | | 10/1974 | Sarcia |
| 3,949,501 A | * | 4/1976 | Andrews et al. .............. 283/82 |
| 3,951,724 A | | 4/1976 | Johnson et al. |
| 4,064,645 A | | 12/1977 | Wood |
| 4,101,701 A | * | 7/1978 | Gordon ....................... 428/189 |
| 4,158,587 A | * | 6/1979 | Keller et al. ................. 156/216 |
| 4,197,151 A | * | 4/1980 | Muzik ........................ 156/249 |
| 4,259,143 A | | 3/1981 | Giulie et al. |
| 4,771,557 A | | 9/1988 | Bowman |
| 4,892,335 A | * | 1/1990 | Taft ............................. 283/75 |
| 5,010,666 A | | 4/1991 | Robles |
| 5,090,732 A | * | 2/1992 | Kuhns et al. ................. 281/29 |
| 5,824,415 A | * | 10/1998 | Kanki et al. ............. 428/411.1 |

(Continued)

FOREIGN PATENT DOCUMENTS

| | | |
|---|---|---|
| JP | 10249982 A | 9/1998 |

(Continued)

OTHER PUBLICATIONS

Edward Petrie, Handbook of Adhesives and Sealants, Copyright 2000, McGraw-Hill, pp. 402-404.*

(Continued)

*Primary Examiner*—Alicia Chevalier
*Assistant Examiner*—Chris Bruenjes
(74) *Attorney, Agent, or Firm*—Schwartz Cooper Chartered (57) ABSTRACT

A laminating and mounting system include a pouch (10) made of thermal laminating film (15,16) and a thermal adhesive (21,22) on a surface (17,18) both inside the pouch and outside the pouch. A first substrate (19), like a print, is placed within a chamber (25) of the pouch (10). The pouch (10) is attached or aligned with a backer board, a rigid substrate (20). The assembly comprising the pouch (10), print (19) and backer substrate (20) are laminated in one pass by a laminating machine (30) that applies both heat and pressure.

5 Claims, 8 Drawing Sheets

U.S. PATENT DOCUMENTS

| | | | | |
|---|---|---|---|---|
| 6,108,957 | A * | 8/2000 | Zapawa | 40/654.01 |
| 6,124,032 | A | 9/2000 | Bloch et al. | |
| 6,131,636 | A * | 10/2000 | Anderson et al. | 156/555 |
| 6,159,327 | A * | 12/2000 | Forkert | 156/264 |
| 6,322,862 | B1 * | 11/2001 | Sakai | 428/13 |
| 6,379,765 | B1 | 4/2002 | Woods | |
| 6,460,280 | B1 | 10/2002 | Haines-Woon | |
| 6,524,413 | B1 | 2/2003 | Dowzall et al. | |
| 6,683,520 | B1 * | 1/2004 | Sakai | 335/285 |
| 6,692,806 | B2 * | 2/2004 | Woods | 428/40.1 |
| 2003/0148044 | A1 * | 8/2003 | Auld et al. | 428/13 |
| 2004/0053040 | A1 * | 3/2004 | Goodson et al. | 428/326 |
| 2004/0081788 | A1 * | 4/2004 | Sudofsky | 428/40.1 |

FOREIGN PATENT DOCUMENTS

JP     2001212910 A * 8/2001

OTHER PUBLICATIONS

Machine Translation of JP 2001-212910 A.*

* cited by examiner

MOUNTING AND LAMINATING SYSTEM

TECHNICAL FIELD

The present invention generally relates to laminated systems and more particularly to a thermal laminated product and the method to make the laminated product. The process uses one step to laminate a first substrate, like a brochure or picture, to a second rigid or semi-rigid second substrate, such as foam board, GATORBOARD®, PVC board, SYNTRA®, matt board, illustration board and cardboard (e.g., 24 pt. board). The product incorporates a pouch having a heat activated adhesive on both sides of the back surface.

BACKGROUND ART

Lamination with protective films is commonly used to protect print substrates. The laminated product not only looks nice, but also protects from the aging process and environment. Such products typically include a media or substrate such as paper (documents, posters and photographs), polyvinyl chloride (PVC) plastic cards (credit cards, driver's license, or other identification cards), cardboard (packaging or posters), foam-board (presentation, exhibition or display pieces), etc., laminated on one or both sides with a transparent plastic film. The film can be glossy or matte or with a particular texture depending upon the application. Examples of such products include menus, book covers, presentation folders, boxes, video cassette cases, record and CD jackets and displays for stores and exhibition.

Items to be laminated can be laminated using one-sided or two-sided laminations. Also, the laminating and mounting process can be accomplished using heat and pressure (thermal lamination process) or pressure alone (pressure sensitive process). Usually the adhesive employed dictates the process to be used.

For certain applications, it is desired to mount a first substrate onto a supportive rigid second substrate, such as foam board, GATORBOARD®, PVC board, SYNTRA®, matt board, illustration board or cardboard (e.g., 24 pt. board). Typically, the first substrate is first laminated (using one- or two-sided lamination), then adhered onto the second substrate. This laminating and/or mounting process can be accomplished using heat or pressure or a combination thereof by using wet adhesives, thermal lamination and/or pressure sensitive adhesives.

In the thermal lamination process, the film, generally polypropylene, polyester, vinyl or nylon, has a layer of heat activated adhesive on one side. The adhesive side is placed against the article or articles to be laminated. The articles to be laminated take two forms: precut and continuous. Usually, the items to be laminated are precut, separated and stacked and then fed automatically or manually into the laminating machine. In the alternative, the articles are continuous or in roll form and fed into the machine. Once laminated, the product is cut at its ends (the leading edge and the trailing edge) and slit along its sides (the side margins).

The film can also be in the form of a discreet sheet, integrated with the substrate to be laminated or separate from the substrate to be laminated, or in continuous, web form. Discreet sheets are commonly used with pouches, e.g., drivers' licenses, school pictures, posters, etc. In "pouch-type" laminations, the film is integrated with the substrate to be laminated. Specifically, the film is hingedly adhered to an edge of the substrate, typically foam board. The integral film has a heat activated adhesive on the side of the film facing the substrate.

In continuous form, the film is supplied to the laminator from a supply roll and in web form. Usually, the web of film is fed to the laminating machine from a supply roll and the articles to be laminated are supplied to the machine individually. If the lamination is to be one-sided, the film is supplied from a single roll; if the lamination is to be two-sided, the film is supplied from two, separate rolls, one above the article to be laminated and one below the article to be laminated.

The coatings or adhesives used on these films incorporate vinyl acetate into the backbone of the polyethylene polymer. The resulting resin is an EVA (Polyethylene Vinyl Acetate copolymer) or form thereof. These adhesives are not tacky at room temperature, but become tacky when heat is applied to them, e.g., over 175° F.

As noted previously, for certain applications, such as presentations, advertisements, exhibits, educational training, etc., it is desirable to mount the substrate to be laminated onto a supportive backing, such as a rigid substrate or semi-rigid substrate (e.g., foam board, GATORBOARD®, PVC board, SYNTRA®, matt board, illustration board and cardboard (e.g., 24 pt. board)).

As noted previously, for certain applications, such as presentations, advertisements, exhibits, educational training, etc., it is desirable to mount the substrate to be laminated onto a supportive backing, such as a rigid or semi-rigid substrate (e.g., cardboard, foam board, GATORBOARD®, etc.). To simplify and clarify discussion, the item to be laminated will be called at times the "print substrate," even though it does not necessarily need to be printed. In addition, the surface facing outwardly towards the viewer will be called the "front surface," and the surface facing the backer board will be called the "back surface."

FIGS. 5-11 generally show various processes used today. The laminator is generally shown by the reference number 30. It includes a pair of pressure rollers 101,102, a pair of film supply rollers 105,106 (for thermal laminated film (requiring heat) or PSA film (not requiring heat)), a pair of pull rollers 103,104 and at least one release liner rewind 107. Typically, a print substrate 200 is first laminated on its front surface (one-sided lamination) via a lamination process and then adhered, via its back surface, onto a rigid backer or substrate via a second lamination process. As such, it usually requires several passes through a laminating machine to laminate the print substrate to a backer board.

Figure 5:
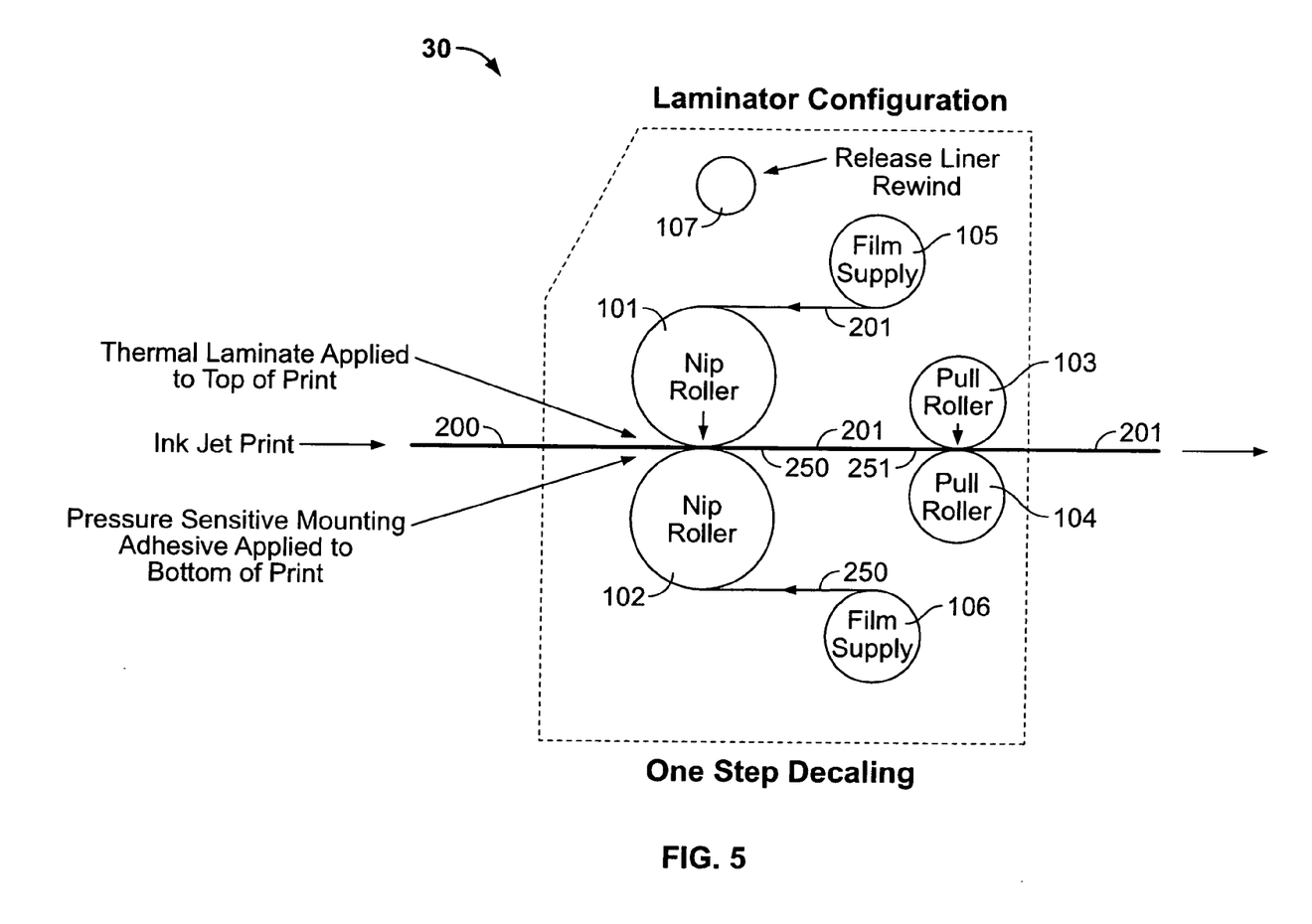
Figure 9:
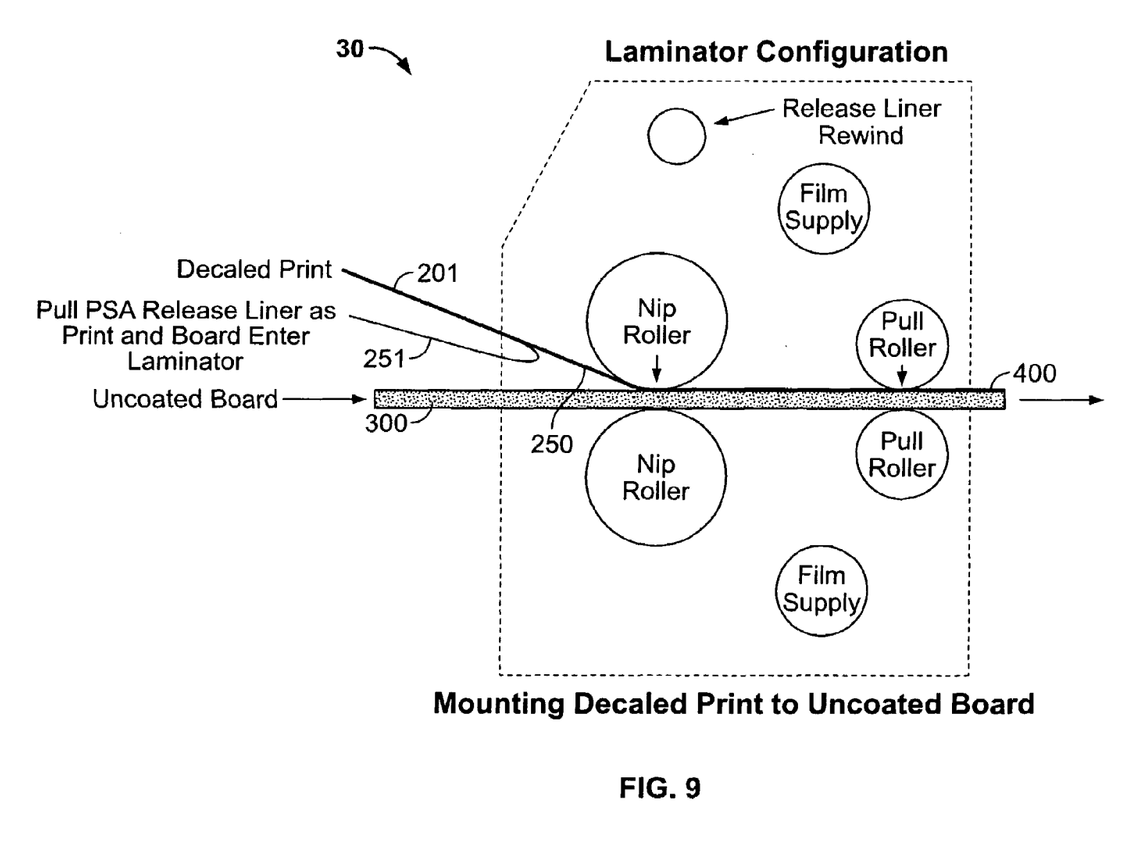

According to a first process, the print substrate 200 is first laminated on the front surface (top) with a thermal laminating film 201 and on the back surface (bottom) with a pressure sensitive mounting adhesive (PSA) (on film) 250 with a backing tape 251 (FIG. 5). The resulting product is a decaled print 201. The decaled print 201 is then fed through a laminating machine 30 (without the heat being turned on) abutting the backer board 300 while the backing tape 251 is pulled from the PSA 250 (FIG. 9). The backing tape 251 is removed before the substrates enter the nip rollers 101,102 so as to expose the adhesive to the backer board 300. The emerging product is the laminated print on a backing board 400.

Figure 6:
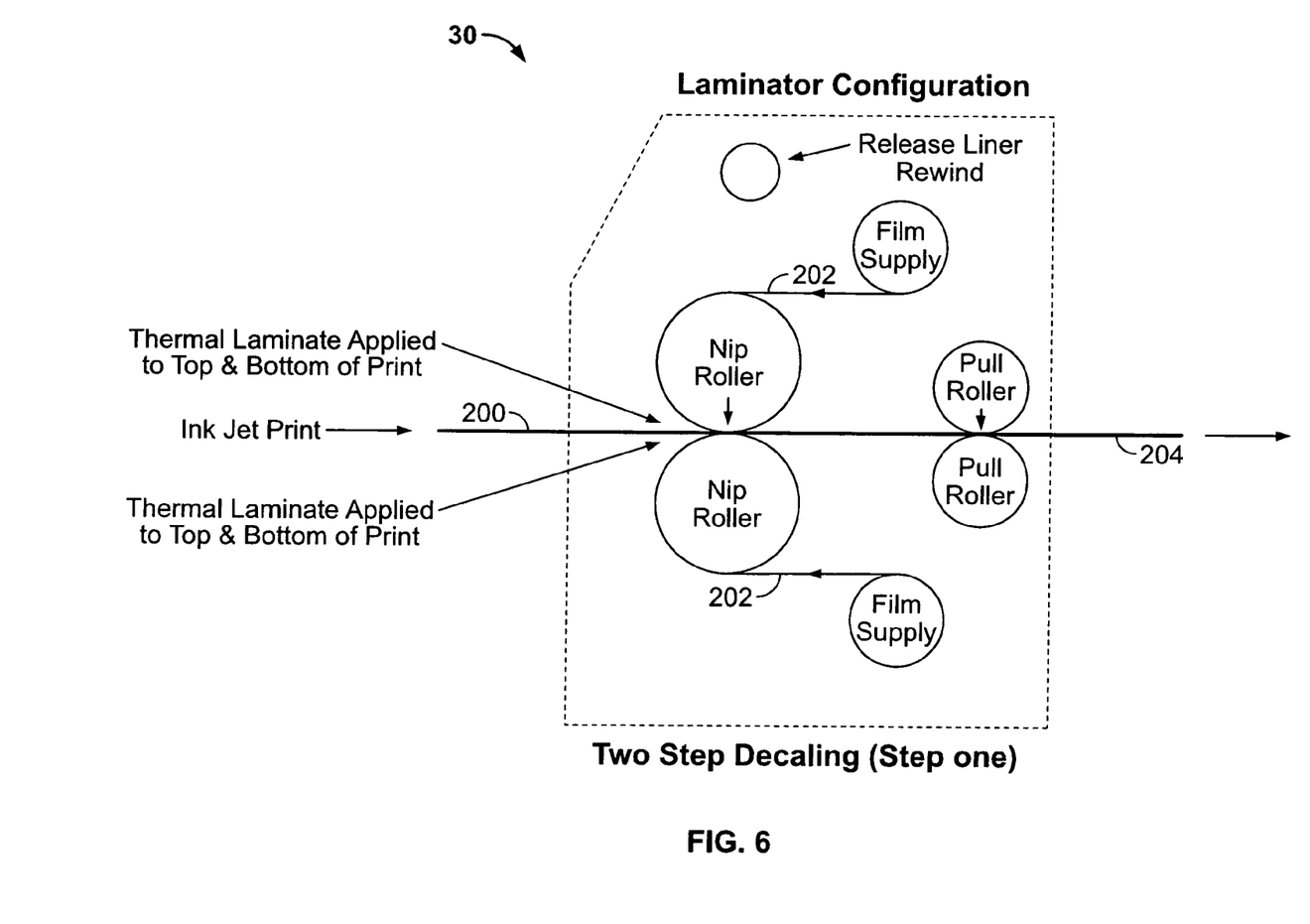
Figure 7:
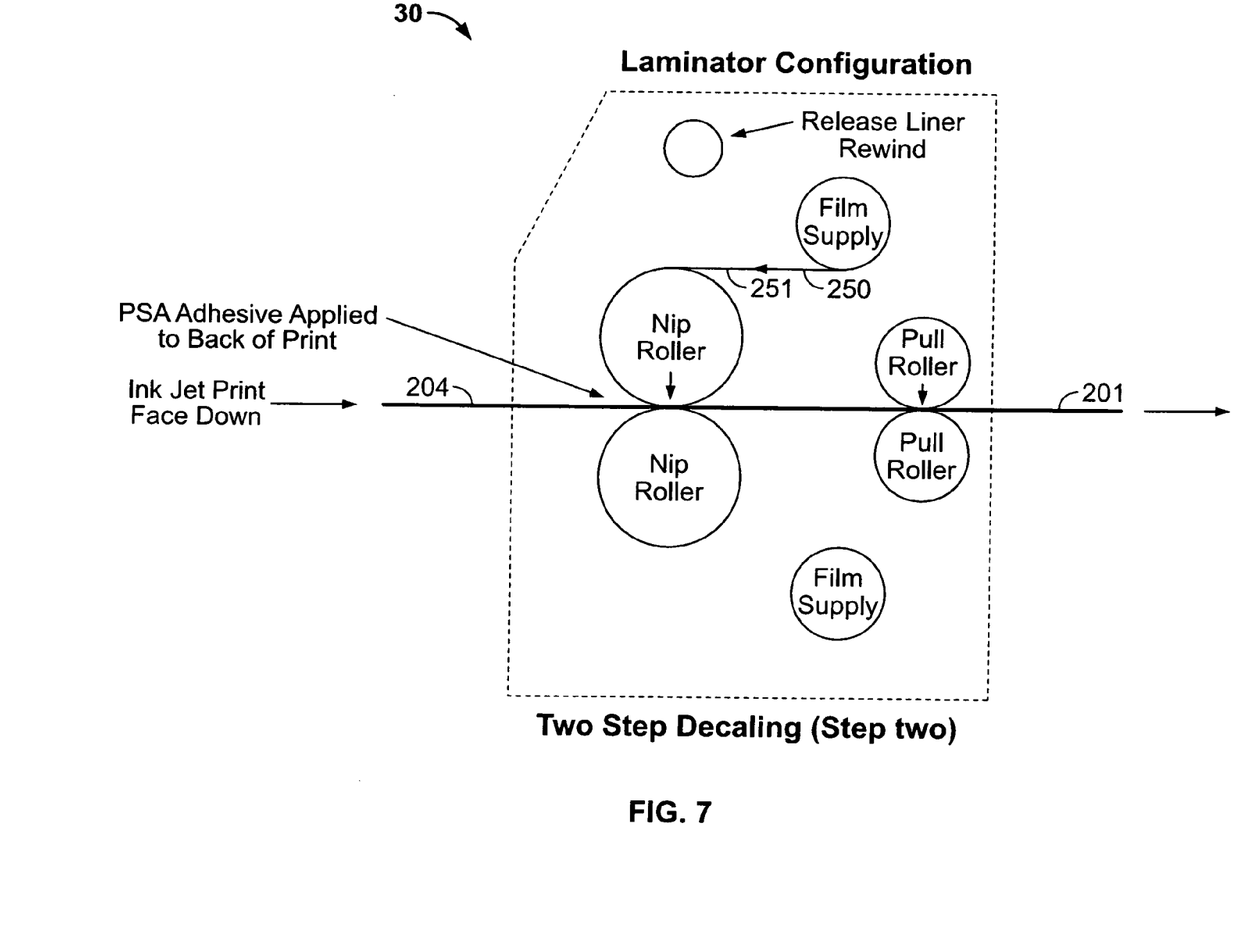

According to a second process, the print substrate 200 is first laminated on the front surface (top) and the back surface (bottom) with a thermal laminating film 202 (FIG. 6). The emerging product is a two-sided laminate 204. The two-sided laminate 204 is fed into the same laminating machine or another laminating machine and is laminated on the back surface (bottom) with a pressure sensitive mounting adhesive (PSA) (on film) 250 with a backing tape 251 (FIG. 7). The resulting product is also a decaled print 201. The decaled print 201 is then fed through a laminating machine 30 (without the heat being turned on) abutting the backer board 300 while the backing tape 251 is pulled from the PSA 250 (FIG. 9). The emerging product is the laminated print on a backing board 400.

Figure 8:
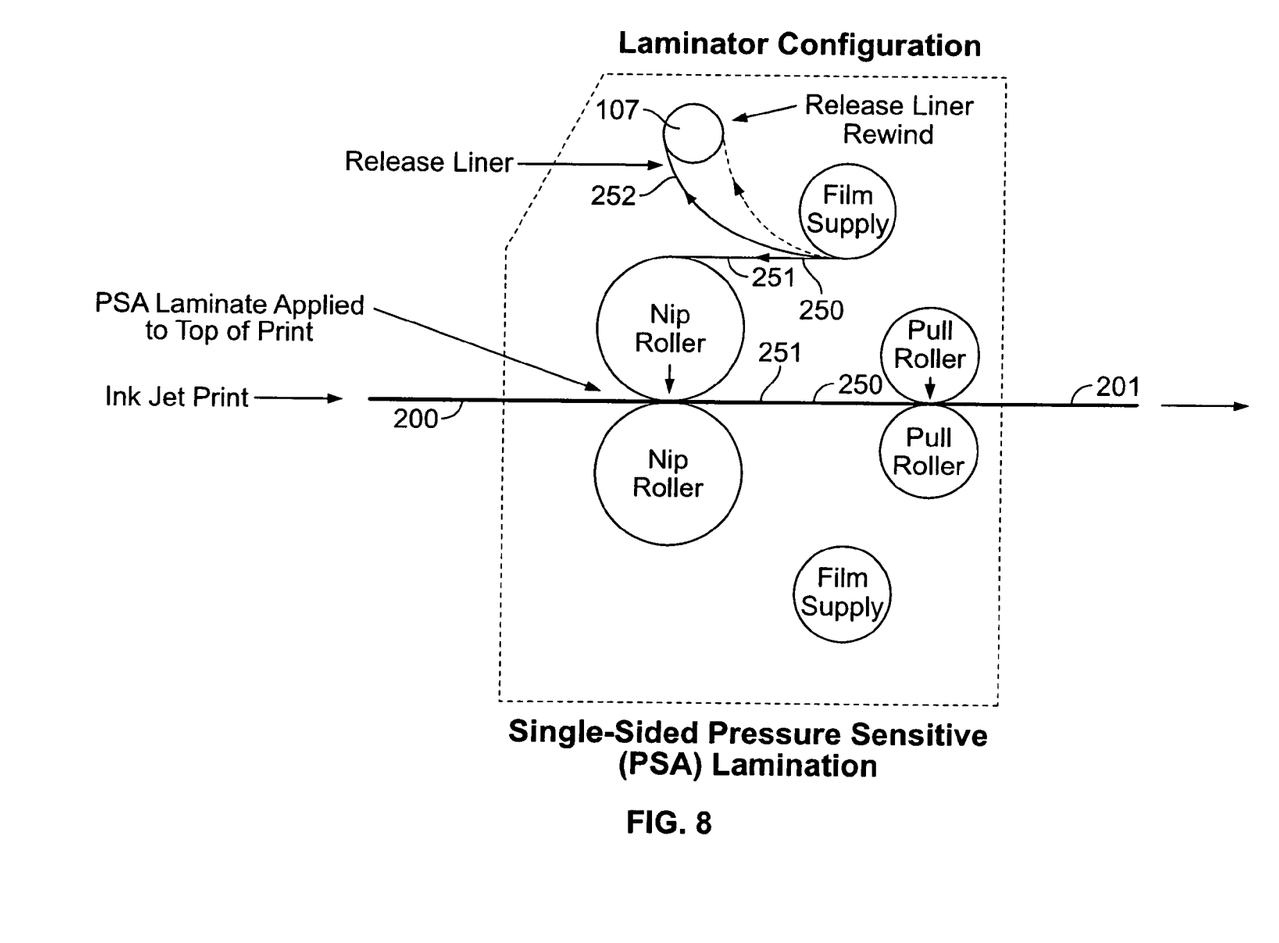

According to a third process, the print substrate 200 is laminated via an unheated laminator 30 on the back surface (bottom) with a with a pressure sensitive mounting adhesive (PSA) (on film) 250 with a backing tape 251 (FIG. 8). A first backing tape 252 is removed to adhere the PSA to the print substrate 200. The resulting product is yet another decaled print 201. The decaled print 201 is then fed through a laminating machine 30 (without the heat being turned on) abutting the backer board 300 while the backing tape 251 is pulled from the PSA 250 (FIG. 9). The emerging product is a print on a backing board 400.

Figure 10:
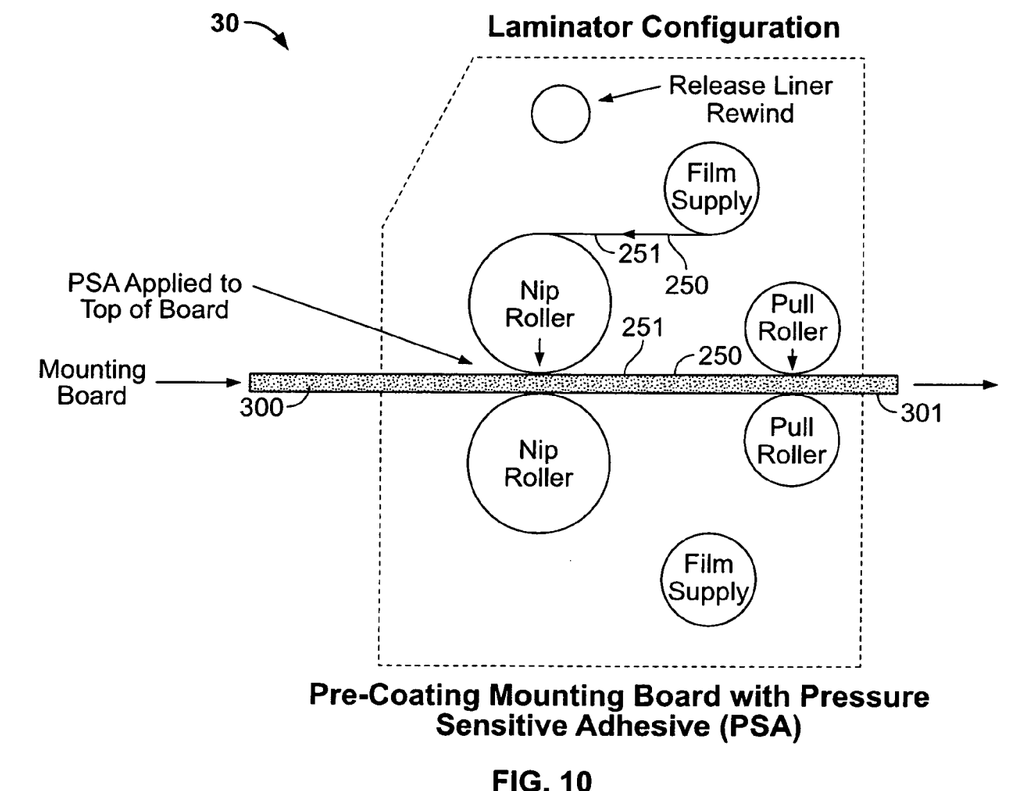
Figure 11:
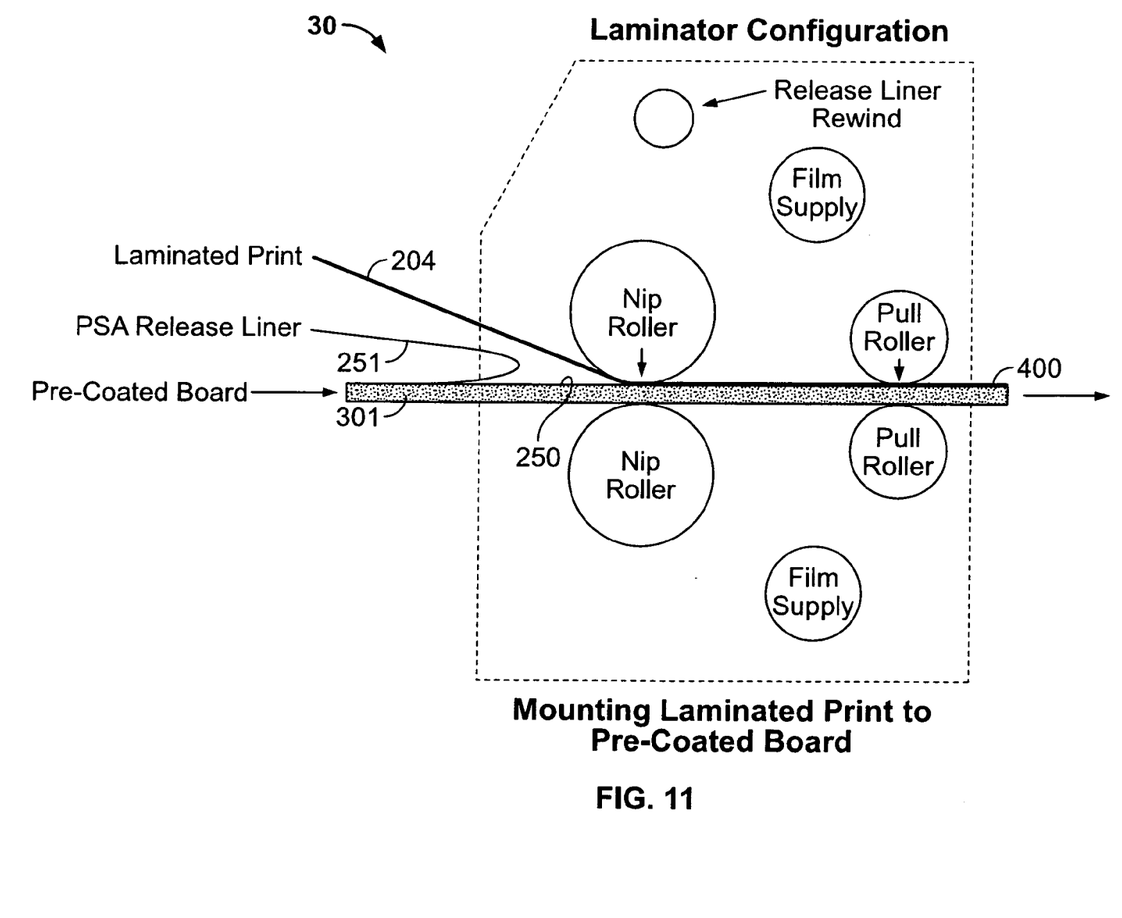

According to a fourth process, the backer or mounting board 300 is laminated via a laminator 30 on the front surface (top) with a pressure sensitive mounting adhesive (PSA) (on film) 250 with a backing tape 251 (FIG. 10). The resulting product is a pre-coated mounting board 301. As shown in FIG. 11, a decaled print 202 (made according to the process shown in FIG. 6) is then fed through a laminating machine 30 (without the heat being turned on) abutting the pre-coated mounting/backer board 301 while the backing tape 251 is pulled from the PSA 250 (FIG. 11). The emerging product is the laminated print on a backing board 400.

As discussed above, it usually requires two passes through a laminating machine to laminate the print substrate to a backer board. It should be noted that in addition to being very time consuming, this has inherent problems. For example, the thicknesses of the print substrate (the first pass through the laminating machine) and the backer board with the print substrate (the second pass through the laminating machine) are quite different. Many laminating machines have thickness settings requiring a resetting of the machine with each change in thickness of the items to be laminated. As a result, an operator would be forced to change the machine's setting with each new pass through the machine. In addition, the adhesive used for the first pass through the laminating machine must succumb to the trauma of a second heating with applied pressure. This can cause additional problems such as wrinkles, unevenness, running of adhesive, etc.

Using pressure sensitive adhesives, e.g., substrates having an adhesive with a protective backing tape/sheet covering the adhesive, in the process or steps just described has its own problems. Suffice it to say that just the many steps of peeling off the protective backing, aligning the objects and adhering the objects together two or more times per product can be difficult and riddled with problems.

For example, U.S. Pat. No. 4,197,151 discloses a system for manually mounting a sheet-like article (with a pressure sensitive adhesive coating on both surfaces) onto a rigid substrate. The details outlined in this patent for performing this task speak to the difficulty of the process as a whole. In addition, it is questionable whether the teachings of this patent can be properly applied to large prints, such as banners.

SUMMARY OF THE INVENTION

The present invention discloses dual purpose laminating pouch for mounting and laminating a first substrate to a second substrate. The pouch is constructed of a thermal laminating film and has a first layer of a thermal adhesive on one of its inner pouch surfaces and a second layer of a thermal adhesive on one of its outer surfaces. Both adhesives are similar so that the same thermal heating conditions will activate the layers simultaneously. The adhesive on the inner pouch surfaces seals the first substrate, e.g., print substrate, within the pouch, and the adhesive on the outer pouch surface allows the pouched first substrate to be mounted to the second substrate, e.g., backer board. Because this laminating and mounting can be accomplished simultaneously, it only takes one pass of the product (print substrate, pouch and backer board) through the laminating machine to produce the final product.

BRIEF DESCRIPTION OF THE DRAWINGS

In the accompanying drawings forming part of the specification, and in which like numerals are employed to designate like parts throughout the same.

DETAILED DESCRIPTION OF PREFERRED EMBODIMENTS

While this invention is susceptible of embodiments in many different forms, there is shown in the drawings and will herein be described in detail preferred embodiments of the invention with the understanding the present disclosure is to be considered as an exemplification of the principles of the invention and is not intended to limit the broad aspect of the invention to the embodiments illustrated.

Figure 1:
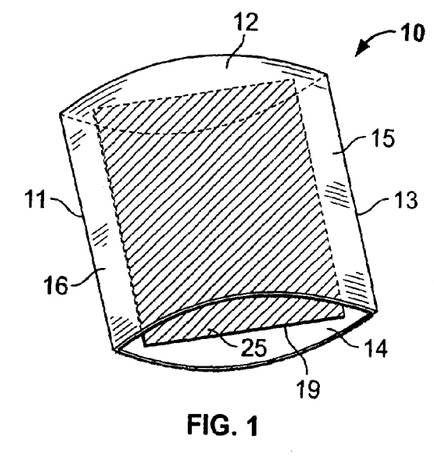
FIG. 1 is a perspective illustration of the laminating pouch employed in the present invention.

Turning to FIG. 1, a laminating pouch 10 is shown comprising a laminating film and thermal adhesive. The laminating film has gloss or matte laminate finishes. The pouch 10 has two layers or sheets 15,16 and four side edges 11,12,13,14, with at least two or three contiguous side edges sealed and at least one side edge (here, edge 14) unsealed, or opened. The sealed edges and top and bottom sheets 15,16 form an chamber 25 open on one or two side edges. The open edge(s) permits one to slide the substrate to be laminated into the chamber 25 of the pouch 10.

Figure 2:
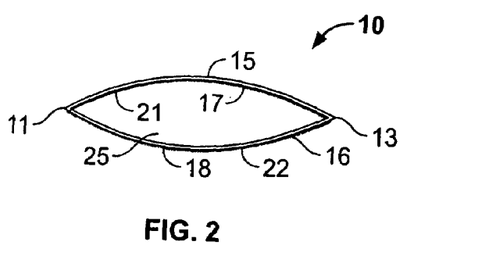
FIG. 2 is a cross-sectional view of the pouch along line 2-2 in FIG. 1.

Referring to FIG. 2, the pouch 10 includes a first layer of thermally activated adhesive 21 on an inner surface. The inner surface is a surface facing inside the pouch and forming the inner chamber of the pouch. The figures show the inner surface 17 of the top layer or sheet 15 having an adhesive applied to it. The pouch 10 also has a second layer of thermally activated adhesive 22 on an outer surface. The outer surface is a surface facing outside (away from the inner chamber 25) the pouch to the environs. The figures show the outer surface 18 of the bottom layer or sheet 16 having the adhesive applied to it.

The film used for the present invention is preferably a thermal laminating film, one made of a thermoplastic polymer. Thermoplastic polymers including polypropylene, polyester, nylon, vinyl and the like, are suitable in a thermal lamination.

The preferable adhesive used for the assembly is SUPER-STICK™ adhesive, manufactured and sold by D&K International, Inc., 1795 Commerce Drive, Elk Grove Village, Ill. 60007 USA. The adhesive is dry to the touch and relies on heat to activate. The activation temperature is approximately 160°-200° F. When the adhesive is heated, it softens, or melts. Under pressure and heat, it marries substrates together. When cooled, the adhesive solidifies and provides an extremely strong chemical bond between the married substrates.

Figure 3:
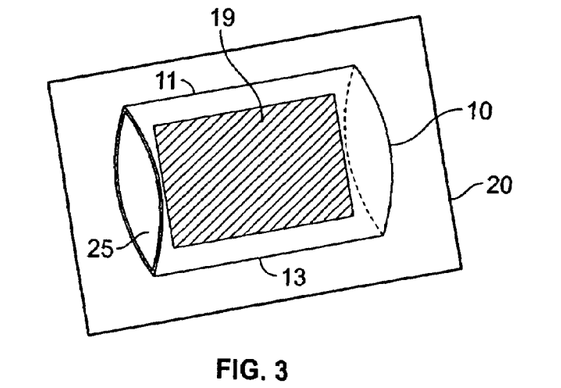
FIG. 3 is a perspective illustration of the assembly including the pouch with the substrate to be laminated therein, and backer substrate combination.
Figure 4:
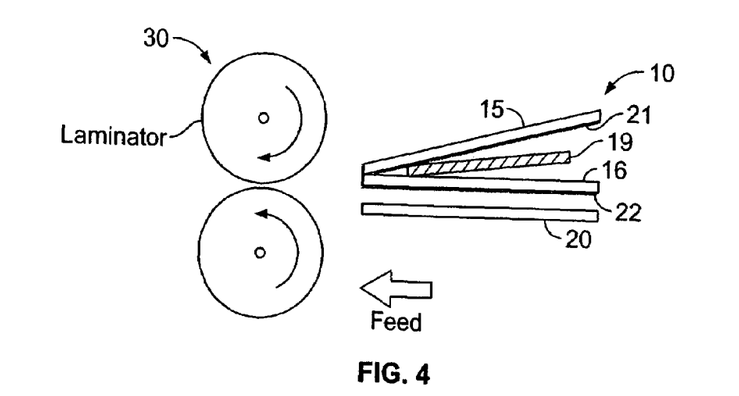
FIG. 4 is a schematic representation of the assembly and the process of laminating it together; and, FIGS. 5-11 show varying stages of making and creating a laminated substrate mounted to a backer board.

Referring back to the Figures, specifically FIGS. 3 and 4, the print substrate 19 (paper, photograph, map, etc.) is inserted into the chamber 25 of the pouch 10. The pouch 10 containing the print substrate 19 inside it is then placed on the surface of a rigid substrate 20 (cardboard, foam board, etc.), as shown in FIG. 3. The pouch 10 can also be pre-attached to the rigid substrate 20 along an edge thereof. The rigid substrate 20 and the pouch 10 combination is then passed through a heated roll laminator 30, shown schematically in FIG. 4.

The laminator assembly, shown schematically as roller 30, applies pressure onto the combination of the pouch 10 and the rigid substrate 20 while heating the combination to about 160°-200° F. The heat applied causes both the thermal adhesive layers 21,22 to melt. With the pressure simultaneously applied by the laminator roller 30, the pouch 10 seals closed, with the print substrate 19 disposed between the upper and lower sheets 15,16 and the pouch 10 to adhere to the backer substrate 20. All of this occurs with just one pass through the laminating machine 30. Once cooled, the product is complete and finished.

The following is an example of making a poster sign. A print (8.5"×11"), such as a hard-to-stick-to fresh digital printer output or color copier output from printers such as Xerox, Xeikon, HP or Cannon, gets inserted into a polyester pouch, with a pH of 7 and having the dimensions 9"×11.5". The pouch has either gloss or matte finish and is about 9 mm in thickness. The pouch has a layer of a thermal adhesive on the inner surface of its top layer, and a layer of the thermal adhesive on the outer surface of its bottom layer. The thermal adhesive used on the assembly is SUPERSTICK™ thermal adhesive by D&K International, Inc. and also has a pH of 7. The pouch is sealed along two of its four edges. As such, the print can be easily slid through the opening formed by the unsealed edges into the pouch chamber formed between the top and bottom sheets of the pouch.

The pouch with the inserted print is placed on a foam board. It should be noted that the pouch can be pre-attached to the backer board or merely placed onto the backer board and aligned to its desired position. In either, the adhesive on the outer surface of the pouch abuts the backer board. The entire assembly if put through a laminator that applies both pressure and heat (160°-200° F.). The recommended speed of the laminator is 1-3 fpm (frames per minute).

Additional pouch sizes include 9"×11.5" to 36"×48".

Finally, while the system above describes a system wherein the pouch carries adhesives on two sides (inside chamber and outer surface abutting backer board), the backer board can, in fact carry the adhesive instead of the outer surface of the pouch.

While specific embodiments have been illustrated and described, numerous modifications come to mind without departing from the spirit of the invention and the scope of the protection is only limited by the scope of the accompanying claims.

What is claimed is:

1. A single-pass thermal laminated assembly comprising:
   a substantially flexible pouch formed by at least two opposing layers of substantially flexible film, the pouch having a perimeter edge with the opposing layers of film being attached to each other along at least a portion of the perimeter edge and not being attached to each other along another portion of the perimeter edge so as to form an opening between the opposing layers of film along the perimeter edge, each opposing layer having an inner surface facing the other layer so as to form an inner chamber therebetween and each opposing layer having an outer surface facing away from the other layer;
   a thermal activated adhesive that has not been activated substantially covering an outer surface of at least one of the layers and substantially covering an inner surface of at least one of the layers, the thermal adhesive capable of being activated upon being heated to at least a threshold activation temperature;
   a first substrate adapted to fit through the opening and within the inner chamber so as to be in contact with the adhesive on the inner surface;
   a substantially semi-rigid or rigid second substrate in contact with the adhesive on the outer surface; and,
   the assembly capable of being formed by positioning the pouch adjacent the second substrate and then once through a thermal laminating system applying at least the threshold activation temperature and a pressure so that the first substrate becomes laminated within the pouch and the pouch becomes laminated to the second substrate.

2. The assembly of claim 1 wherein the adhesive melts at a temperature of between about 160° F. and 200° F.

3. The assembly of claim 1 wherein the films are thermal laminating film and the activation temperature of the adhesive is approximately 160° F.

4. The assembly of claim 3 wherein the thermal laminating film is one of polypropylene, polyester, vinyl and nylon.

5. The assembly of claim 1 wherein the second substrate is one of cardboard, foam board, PVC board, matt board, illustration board or cardboard.

* * * * *